US012587317B2

(12) United States Patent　　　　(10) Patent No.:　US 12,587,317 B2

Hsu et al.　　　　　　　　　　　　　(45) Date of Patent:　Mar. 24, 2026

(54) METHOD AND APPARATUS FOR DEALING WITH NEGOTIATION PROCEDURE INITIATED BY REQUEST ACTION FRAME THROUGH RESPONDING WITH ACKNOWLEDGEMENT CONTROL FRAME OR TIME-CONSTRAINED RESPONSE ACTION FRAME

(71) Applicant: MEDIATEK INC., Hsin-Chu (TW)

(72) Inventors: Chien-Fang Hsu, Hsinchu City (TW);
Cheng-Ying Wu, Hsinchu City (TW);
Chao-Wen Chou, Hsinchu City (TW);
Yongho Seok, San Jose, CA (US)

(73) Assignee: MEDIATEK INC., Hsinchu City (TW)

( * ) Notice: Subject to any disclaimer, the term of this patent is extended or adjusted under 35 U.S.C. 154(b) by 278 days.

(21) Appl. No.: 17/993,910

(22) Filed: Nov. 24, 2022

(65) Prior Publication Data

US 2023/0188266 A1　　Jun. 15, 2023

Related U.S. Application Data

(60) Provisional application No. 63/298,656, filed on Jan. 12, 2022, provisional application No. 63/288,687, filed on Dec. 13, 2021.

(51) Int. Cl.
*H04L 1/1607*　　　　(2023.01)

(52) U.S. Cl.
CPC ................................. *H04L 1/1685* (2013.01)

(58) Field of Classification Search
CPC .... H04L 1/1685; H04L 1/1671; H04L 5/0055
See application file for complete search history.

(56) References Cited

U.S. PATENT DOCUMENTS

| | | | |
|---|---|---|---|
| 9,686,049 B2 | 6/2017 | Fischer | |
| 2009/0067396 A1* | 3/2009 | Fischer | ................. H04L 1/1854 |
| | | | 455/41.2 |
| 2014/0254408 A1 | 9/2014 | Shukla | |
| 2015/0092697 A1* | 4/2015 | Yeow | .................... H04L 5/0055 |
| | | | 370/329 |
| 2015/0131541 A1* | 5/2015 | Prajapati | ............... H04W 88/06 |
| | | | 370/329 |

(Continued)

FOREIGN PATENT DOCUMENTS

| | | |
|---|---|---|
| CN | 101502032 | 8/2009 |
| CN | 106506125 | 3/2017 |

(Continued)

*Primary Examiner* — Nizar N Sivji

(74) *Attorney, Agent, or Firm* — Winston Hsu

(57)　　　　　　　　ABSTRACT

One wireless communication method includes: receiving a request action frame; and in response to the request action frame, generating and sending an acknowledgement (ACK) control frame that is configured to serve as a response action frame for the request action frame, wherein the response action frame is not solicited by the request action frame. Another wireless communication method includes: receiving a request action frame; and in response to the request action frame, generating and sending an acknowledgement (ACK) control frame and a time-constrained response action frame following the ACK control frame, wherein the time-constrained response action frame is solicited by the request action frame.

8 Claims, 6 Drawing Sheets

(56)          References Cited

U.S. PATENT DOCUMENTS

| | | | | |
|---|---|---|---|---|
| 2016/0080115 A1* | 3/2016 | Josiam | ................. | H04L 5/0055 |
| | | | | 370/329 |
| 2016/0302229 A1* | 10/2016 | Hedayat | ............... | H04L 69/324 |
| 2016/0337783 A1* | 11/2016 | Seok | ........................ | H04L 1/16 |
| 2017/0338931 A1* | 11/2017 | Kim | ....................... | H04L 5/0055 |
| 2017/0366362 A1* | 12/2017 | Sakai | ................... | H04L 5/0055 |
| 2018/0262315 A1* | 9/2018 | Chun | ................... | H04W 88/08 |
| 2019/0069213 A1* | 2/2019 | Seok | ................... | H04L 1/1835 |
| 2022/0014311 A1* | 1/2022 | Chitrakar | ............. | H04L 5/0055 |
| 2022/0124852 A1* | 4/2022 | Kim | ...................... | H04L 1/1685 |
| 2022/0407622 A1* | 12/2022 | Kim | ...................... | H04L 1/1896 |
| 2024/0089786 A1* | 3/2024 | Dong | ................... | H04L 1/1896 |
| 2024/0305407 A1* | 9/2024 | Dong | ................... | H04L 1/1896 |

FOREIGN PATENT DOCUMENTS

| | | | | | |
|---|---|---|---|---|---|
| CN | 107736072 A | 2/2018 | | | |
| CN | 109417546 A | 3/2019 | | | |
| EP | 1 869 815 | 12/2007 | | | |
| EP | 2760153 A2 * | 7/2014 | .............. | F21K 9/69 |
| EP | 1 869 815 B1 | 11/2014 | | | |
| EP | 3968731 B1 * | 8/2023 | .......... | H04L 1/1614 |
| WO | WO-2006107886 A2 * | 10/2006 | .............. | F21K 9/69 |

* cited by examiner

METHOD AND APPARATUS FOR DEALING WITH NEGOTIATION PROCEDURE INITIATED BY REQUEST ACTION FRAME THROUGH RESPONDING WITH ACKNOWLEDGEMENT CONTROL FRAME OR TIME-CONSTRAINED RESPONSE ACTION FRAME

CROSS REFERENCE TO RELATED APPLICATIONS

This application claims the benefit of U.S. Provisional Application No. 63/288,687, filed on Dec. 13, 2021. Further, this application claims the benefit of U.S. Provisional Application No. 63/298,656, filed on Jan. 12, 2022. The contents of these applications are incorporated herein by reference.

BACKGROUND

The present invention relates to wireless communications, and more particularly, to a method and apparatus for dealing with a negotiation procedure initiated by a request action frame through responding with an acknowledgement (ACK) control frame or a time-constrained response action frame.

There are three types of 802.11 frames, including management frames, control frames, and data frames. Management frames are used by wireless clients to find and connect to the right wireless fidelity (Wi-Fi) network and manage the client connection after a successful association. The action frame is a type of management frame used to trigger an action. For example, Block ACK action frames (Category 3) include an Add Block ACK (ADDBA) Request frame and an ADDBA Response frame. Control frames are used to control access to the wireless medium and are used for frame acknowledgement. For example, control frames may include a BlockAckReq (BAR) frame, a BlockAck (BA) frame, and an acknowledgement (ACK) frame. In accordance with a typical BAR/BA procedure, an originator (e.g., a transmit-side Wi-Fi device) sends a BAR frame to a recipient (e.g., a receive-side Wi-Fi device), and the recipient responds with a BA frame after receiving the BAR frame, where messages carried by the BAR frame include reordering buffer control information, such as a starting sequence number (SSN) and a traffic identifier (TID), and the messages carried by the BA frame include SSN copied from the BAR frame. However, the BAR frame and the BA frame are control frames that are unprotected frames. Transmitting unprotected frames over the air make connections vulnerable to attack.

To resolve the security issues of the typical BAR/BA procedure, the typical BAR/BA procedure may be replaced with a secured procedure using secured frames (e.g., protected action frames). In accordance with the typical BAR/BA procedure, the recipient responds with a BA frame immediately after short interframe space (SIFS) of ending of the BAR frame. However, in accordance with the secured procedure using protected action frames, a robust response action frame may be sent from the recipient to the originator (which sends a robust request action frame that is paired with the robust response action frame) after a much longer period. The originator needs to wait for the robust response action frame and may stop transmission, which results in degraded performance due to ongoing traffic being halted.

SUMMARY

One of the objectives of the claimed invention is to provide a method and apparatus for dealing with a negotiation procedure initiated by a request action frame through responding with an acknowledgement control frame or a time-constrained response action frame.

According to a first aspect of the present invention, an exemplary wireless communication method is disclosed. The exemplary wireless communication method includes: receiving a request action frame; and in response to the request action frame, generating and sending an acknowledgement (ACK) control frame that is configured to serve as a response action frame for the request action frame, wherein the response action frame is not solicited by the request action frame.

According to a second aspect of the present invention, an exemplary wireless communication method is disclosed. The exemplary wireless communication method includes: receiving a request action frame; and in response to the request action frame, generating and sending an acknowledgement (ACK) control frame and a time-constrained response action frame following the ACK control frame, wherein the time-constrained response action frame is solicited by the request action frame.

According to a third aspect of the present invention, an exemplary wireless communication device is disclosed. The exemplary wireless communication device includes a network interface circuit and a control circuit. In response to a request action frame received by the network interface circuit, the control circuit is arranged to generate an acknowledgement (ACK) control frame that is configured to serve as a response action frame for the request action frame, and instruct the network interface circuit to send the ACK control frame, wherein the response action frame is not solicited by the request action frame.

According to a fourth aspect of the present invention, an exemplary wireless communication device is disclosed. The exemplary wireless communication device includes a network interface circuit and a control circuit. In response to a request action frame received by the network interface circuit, the control circuit is arranged to generate an acknowledgement (ACK) control frame and instruct the network interface circuit to send the ACK control frame, and is further arranged to generate a time-constrained response action frame following the ACK control frame and instruct the network interface circuit to send the time-constrained response action frame, wherein the time-constrained response action frame is solicited by the request action frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
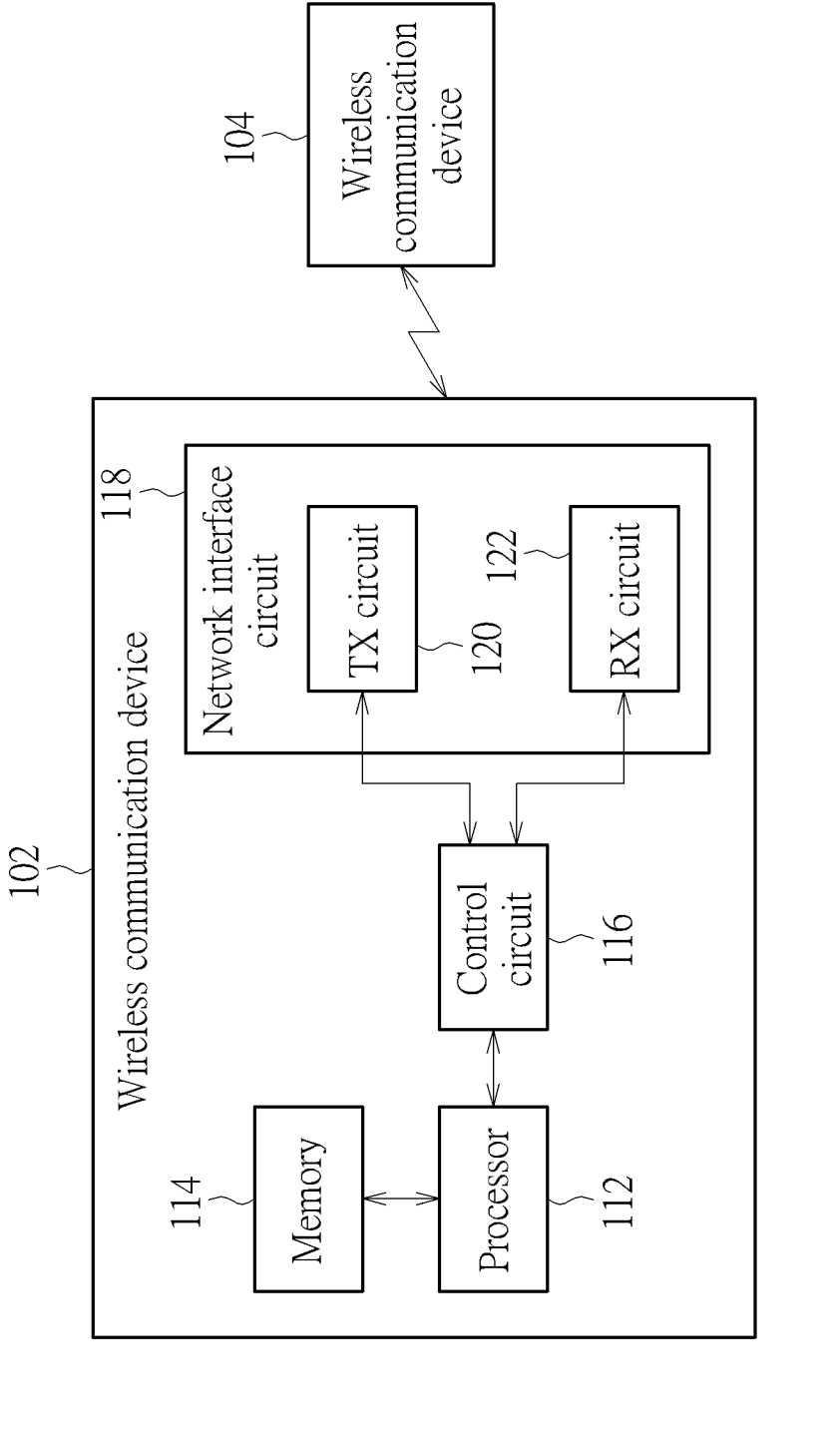
FIG. 1 is a diagram illustrating a wireless communication system according to an embodiment of the present invention.

FIG. 1 is a diagram illustrating a wireless communication system according to an embodiment of the present invention. The wireless communication system 100 includes a plurality of wireless communication devices 102 and 104. For example, the wireless communication system 100 is a wireless fidelity (Wi-Fi) system, including an access point (AP) and a non-AP station (STA). In one embodiment of the present invention, the wireless communication device 102 may be an AP, and the wireless communication device 104 may be a non-AP STA. In another embodiment of the present invention, the wireless communication device 102 may be a non-AP STA, and the wireless communication device 104 may be an AP. For brevity and simplicity, only two wireless communication devices 102 and 104 are shown in FIG. 1. In practice, the wireless communication system 100 is allowed to have more than two wireless communication devices, including an AP and more than one non-AP STA in the same basic service set (BSS).

The wireless communication devices 102 and 104 may have the same circuit structure. Taking the wireless communication device 102 for example, it includes a processor 112, a memory 114, a control circuit 116, and a network interface circuit 118, where the network interface circuit 118 includes a transmitter (TX) circuit 120 and a receiver (RX) circuit 122. The memory 114 is arranged to store a program code. The processor 112 is arranged to load and execute the program code to manage the wireless communication device 102. The control circuit 116 is arranged to control wireless communications with the wireless communication device 104. In a case where the wireless communication device 102 is an AP and the wireless communication device 104 is a non-AP STA, the control circuit 116 controls the TX circuit 120 of the network interface circuit 118 to deal with downlink (DL) traffic between AP and non-AP STA, and controls the RX circuit 122 of the network interface circuit 118 to deal with uplink (UL) traffic between AP and non-AP STA. In another case where the wireless communication device 102 is a non-AP STA and the wireless communication device 104 is an AP, the control circuit 116 controls the TX circuit 120 of the network interface circuit 118 to deal with UL traffic between AP and non-AP STA, and controls the RX circuit 122 of the network interface circuit 118 to deal with DL traffic between AP and non-AP STA.

It should be noted that only the components pertinent to the present invention are illustrated in FIG. 1. In practice, the wireless communication device 102 may include additional components to achieve designated functions.

In this embodiment, the wireless communication device 104 may be an originator (e.g., a transmit-side Wi-Fi device) that sends a request action frame to the wireless communication device 102 that act as a recipient (e.g., a receive-side Wi-Fi device). In one exemplary design, the wireless communication device 102 adopts the proposed wireless communication method to generate and send an ACK control frame that is configured to serve as a response action frame for the received request action frame, wherein the response action frame is not solicited by the request action frame. More specifically, in response to a request action frame sent from the wireless communication device 104 and received by the network interface circuit 118 (particularly, RX circuit 122 of network interface circuit 118), the control circuit 116 is arranged to generate an ACK control frame that is configured to serve as a response action frame for the request action frame, and instruct the network interface circuit 118 (particularly, TX circuit 120 of network interface circuit 118) to send the ACK control frame to the wireless communication device 104.

In another exemplary design, the wireless communication device 102 adopts the proposed wireless communication method to generate and send an ACK control frame and a time-constrained response action frame following the ACK control frame, wherein the time-constrained response action frame is solicited by the received request action frame. More specifically, in response to a request action frame sent from the wireless communication device 104 and received by the network interface circuit 118 (particularly, RX circuit 122 of network interface circuit 118), the control circuit 116 is arranged to generate an ACK control frame and instruct the network interface circuit 118 (particularly, TX circuit 120 of network interface circuit 118) to send the ACK control frame, and is further arranged to generate a time-constrained response action frame following the ACK control frame and instruct the network interface circuit 118 (particularly, TX circuit 120 of network interface circuit 118) to send the time-constrained response action frame to the wireless communication device 104. The request action frame and the time-constrained response action frame are in pair, meaning that the time-constrained response action frame is a must to respond to the request action frame to complete the negotiation procedure that is initiated by the request action frame.

For certain kinds of action frames in 802.11, to complete a negotiation procedure, the request/response exchange is necessary. The present invention proposes a wireless communication method to deal with a negotiation procedure initiated by a request action frame through responding with an ACK control frame or a time-constrained response action frame. Since the ACK control frame is sent immediately after SIFS of ending of the request action frame and the originator views the ACK control frame as a valid confirmation of successful receive of the request action frame, there is no longer time period needed by the originator to wait for the response action frame. Similarly, since the time-constrained response action frame is sent from the recipient under certain time constraint, there is no longer time period needed by the originator to wait for the response action frame.

In some applications, the proposed wireless communication method can be employed by a secured procedure to resolve the security issues of the typical BAR/BA procedure. That is, the aforementioned request action frame can be an ADDBA request frame, and the aforementioned response action frame can be an ADDBA response frame. Several examples of using a secured procedure with the proposed wireless communication method to replace the typical BAR/BA procedure for reordering buffer control are described as below with reference to the accompanying drawings.

Figure 2:
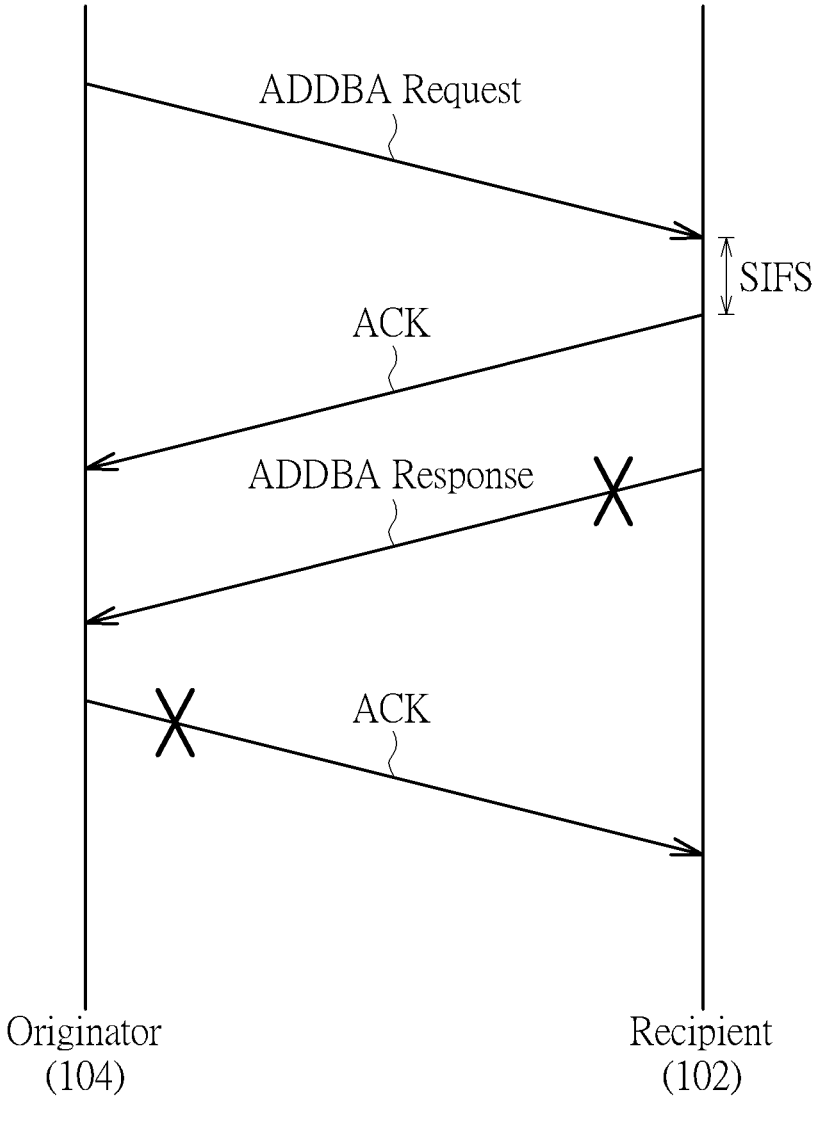
FIG. 2 is a sequence diagram illustrating a first negotiation procedure between an originator and a recipient according to an embodiment of the present invention.

Please refer to FIG. 2 in conjunction with FIG. 1. FIG. 2 is a sequence diagram illustrating a first negotiation procedure between an originator and a recipient according to an embodiment of the present invention. In this embodiment, the negotiation procedure is a secured procedure that can be used to replace the typical BAR/BA procedure for reordering buffer control. The wireless communication device 104 acts as an originator, and the wireless communication device 102 acts as a recipient. Hence, the wireless communication device 104 initiates the secured procedure for reordering buffer control by sending an ADDBA request frame to the wireless communication device 102, where the ADDBA request frame is a protected management frame configured to serve as a BAR frame (i.e., a substitute of a BAR frame) and carry reordering buffer control information (e.g., SSN and TID). In some embodiments, the ADDBA request frame is further configured to carry an indication, where the indication indicates that the ADDBA request frame serves as the BAR frame, thereby differentiating the usage of the ADDBA request frame.

In response to the ADDBA request frame received by the RX circuit 122 of the network interface circuit 118, the control circuit 116 generates an ACK frame (which is a control frame), and instructs the TX circuit 120 of the network interface circuit 118 to send the ACK frame to the wireless communication device 104. In this embodiment, an ADDBA response frame is not solicited by the ADDBA request frame, and the ACK frame is configured to serve as a response frame (i.e., a substitute of the ADDBA request frame) for the received ADDBA request frame, and is sent immediately after SIFS of ending of the ADDBA request frame. Hence, when the wireless communication device 104 receives the ACK frame, the wireless communication device 104 views the ACK frame as a valid confirmation of successful receive of the ADDBA request frame.

On the recipient side, it may need more time to process medium access control (MAC) service data units (MSDUs) in the reordering buffer and respond with the ACK frame corresponding to the received ADDBA request frame. In some embodiments, a physical layer protocol data unit (PPDU) carrying the ADDBA request frame may include padding bits. That is, the wireless communication device 104 adds proper padding to the PPDU carrying the ADDBA request frame, so that the wireless communication device 102 has more time to process MSDUs in the reordering buffer and respond with the ACK frame corresponding to the received ADDBA request frame. The required padding length can be negotiated or indicated during the association procedure between the wireless communication devices 102 and 104.

As shown in FIG. 2, since the ACK frame corresponding to the ADDBA request frame acts as a response frame according to the present invention, the wireless communication device 102 does not need to send an ADDBA response frame paired with the ADDBA request frame as requested by the typical ADDBA request/response frame exchange; since the wireless communication device 102 does not need to send an ADDBA response frame paired with the ADDBA request frame according to the present invention, the wireless communication device 104 does not need to wait for the ADDBA response frame that may be sent after a longer period according to the typical ADDBA request/response frame exchange; and since the wireless communication device 102 does not need to send an ADDBA response frame paired with the ADDBA request frame according to the present invention, the wireless communication device 104 does not need to respond with an ACK frame for the ADDBA response frame as requested by the typical ADDBA request/response frame exchange. The performance degradation issue suffered from using a typical secured procedure to replace a typical BAR/BA procedure can be resolved by using the proposed procedure shown in FIG. 2.

Figure 3:
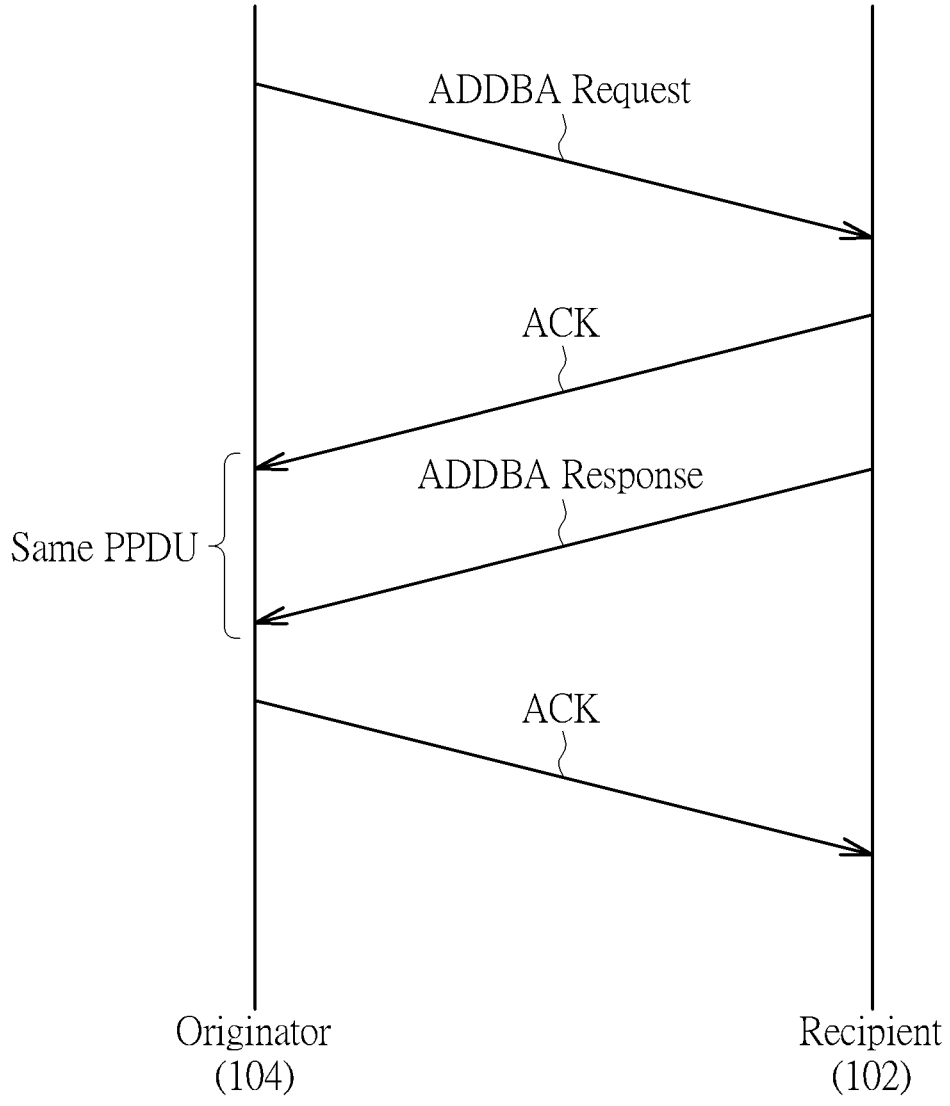
FIG. 3 is a sequence diagram illustrating a second negotiation procedure between an originator and a recipient according to an embodiment of the present invention.

Please refer to FIG. 3 in conjunction with FIG. 1. FIG. 3 is a sequence diagram illustrating a second negotiation procedure between an originator and a recipient according to an embodiment of the present invention. In this embodiment, the negotiation procedure is a secured procedure that can be used to replace the typical BAR/BA procedure for reordering buffer control. The wireless communication device 104 acts as an originator, and the wireless communication device 102 acts as a recipient. The proposed negotiation procedure shown in FIG. 3 is based on the typical ADDBA request/response frame exchange. The major difference between the proposed negotiation procedure and the typical ADDBA request/response frame exchange is that time constraint is intentionally applied to the ADDBA response frame. In other words, the proposed negotiation procedure uses a time-constrained ADDBA response frame. For example, time constraint is applied to the ADDBA response frame by forcing aggregation of two MAC frames, including an ACK frame (which corresponds to the ADDBA request frame) and the ADDBA response frame, into the same PPDU for transmission.

As shown in FIG. 3, the wireless communication device 104 initiates the secured procedure for reordering buffer control by sending an ADDBA request frame to the wireless communication device 102, where the ADDBA request frame is a protected management frame configured to serve as a BAR frame (i.e., a substitute of a BAR frame) and carry reordering buffer control information (e.g., SSN and TID). In some embodiments, the ADDBA request frame is further configured to carry an indication, where the indication indicates that the ADDBA request frame serves as the BAR frame, thereby differentiating the usage of the ADDBA request frame.

In response to the ADDBA request frame received by the RX circuit 122 of the network interface circuit 118, the control circuit 116 generates an ACK frame (which is a control frame) and an ADDBA response frame (which is a protected management frame), aggregates the ACK control frame and the ADDBA response frame in one PPDU, and instruct the TX circuit 120 of the network interface circuit 118 to send the PPDU to the wireless communication device 104.

In this embodiment, the ADDBA response frame is solicited by the ADDBA request frame, and is configured to serve as a BA frame (i.e., a substitute of a BA frame) and carry information (e.g., SSN) copied from recording buffer control information carried by the ADDBA request frame. The PPDU includes the ACK frame corresponding to the ADDBA request frame and the ADDBA response frame paired with the ADDBA request frame, and is sent immediately after SIFS of ending of the ADDBA request frame. Hence, with the help of the aggregation of the ACK frame (which is sent immediately after SIFS of ending of the ADDBA request frame according to the ADDBA request/response frame exchange) and the ADDBA response frame (which is aggregated into a PPDU and transmitted along with the ACK frame that is aggregated in the same PPDU), the ADDBA request frame is a time-constrained response action frame that is forced to be sent immediately after SIFS of ending of the ADDBA request frame. The performance degradation issue suffered from using a typical secured procedure to replace a typical BAR/BA procedure can be resolved by using the proposed procedure shown in FIG. 3.

Figure 4:
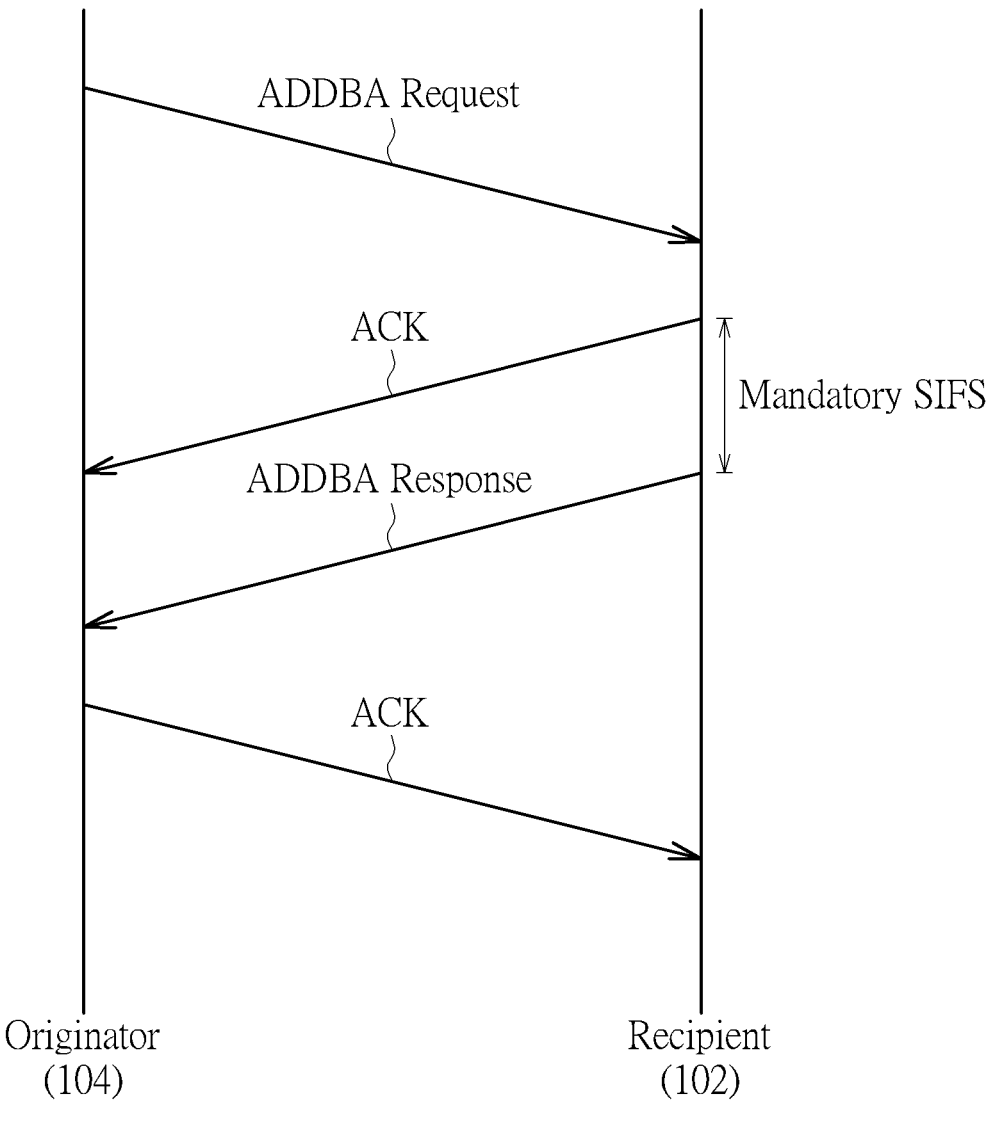
FIG. 4 is a sequence diagram illustrating a third negotiation procedure between an originator and a recipient according to an embodiment of the present invention.

Please refer to FIG. 4 in conjunction with FIG. 1. FIG. 4 is a sequence diagram illustrating a third negotiation procedure between an originator and a recipient according to an embodiment of the present invention. In this embodiment, the negotiation procedure is a secured procedure that can be used to replace the typical BAR/BA procedure for reordering buffer control. The wireless communication device 104 acts as an originator, and the wireless communication device 102 acts as a recipient. The proposed negotiation procedure shown in FIG. 4 is based on the typical ADDBA request/ response frame exchange. The major difference between the proposed negotiation procedure and the typical ADDBA request/response frame exchange is that time constraint is intentionally applied to the ADDBA response frame. In other words, the proposed negotiation procedure uses a time-constrained ADDBA response frame. For example, time constraint is applied to the ADDBA response frame by changing the frame exchange sequence to force mandatory SIFS for transmission of the ADDBA response frame.

As shown in FIG. 4, the wireless communication device 104 initiates the secured procedure for reordering buffer control by sending an ADDBA request frame to the wireless communication device 102, where the ADDBA request frame is a protected management frame configured to serve as a BAR frame (i.e., a substitute of a BAR frame) and carry reordering buffer control information (e.g., SSN and TID). In some embodiments, the ADDBA request frame is further configured to carry an indication, where the indication indicates that the ADDBA request frame serves as the BAR frame, thereby differentiating the usage of the ADDBA request frame.

In response to the ADDBA request frame received by the RX circuit 122 of the network interface circuit 118, the control circuit 116 generates an ACK frame (which is a control frame) corresponding to the ADDBA request frame and instructs the TX circuit 120 of the network interface circuit 118 to send the ACK frame immediately after SIFS of ending of the ADDBA request frame, and further generates an ADDBA response frame (which is a protected management frame) following the ACK frame and instructs the TX circuit 120 of the network interface circuit 118 to send the ADDBA response frame immediately after mandatory SIFS of ending of the ACK frame.

On the recipient side, it may need more time to process MSDUs in the reordering buffer and respond with the ADDBA response frame. In some embodiments, a PPDU carrying the ACK frame (which responds to the ADDBA request frame) may include padding bits. That is, the wireless communication device 102 adds proper padding to the PPDU carrying the ACK frame (which responds to the ADDBA request frame), so that the wireless communication device 102 has more time to process MSDUs in the reordering buffer and respond with the ADDBA response frame (which is paired with the ADDBA request frame).

In this embodiment, the ADDBA response frame is solicited by the ADDBA request frame, and is configured to serve as a BA frame (i.e., a substitute of a BA frame) and carry information (e.g., SSN) copied from recording buffer control information carried by the ADDBA request frame. Since the ADDBA response frame is forced to be sent immediately after mandatory SIFS of ending of the ACK frame, the performance degradation issue suffered from using a typical secured procedure to replace a typical BAR/BA procedure can be resolved by using the proposed procedure shown in FIG. 4.

Figure 5:
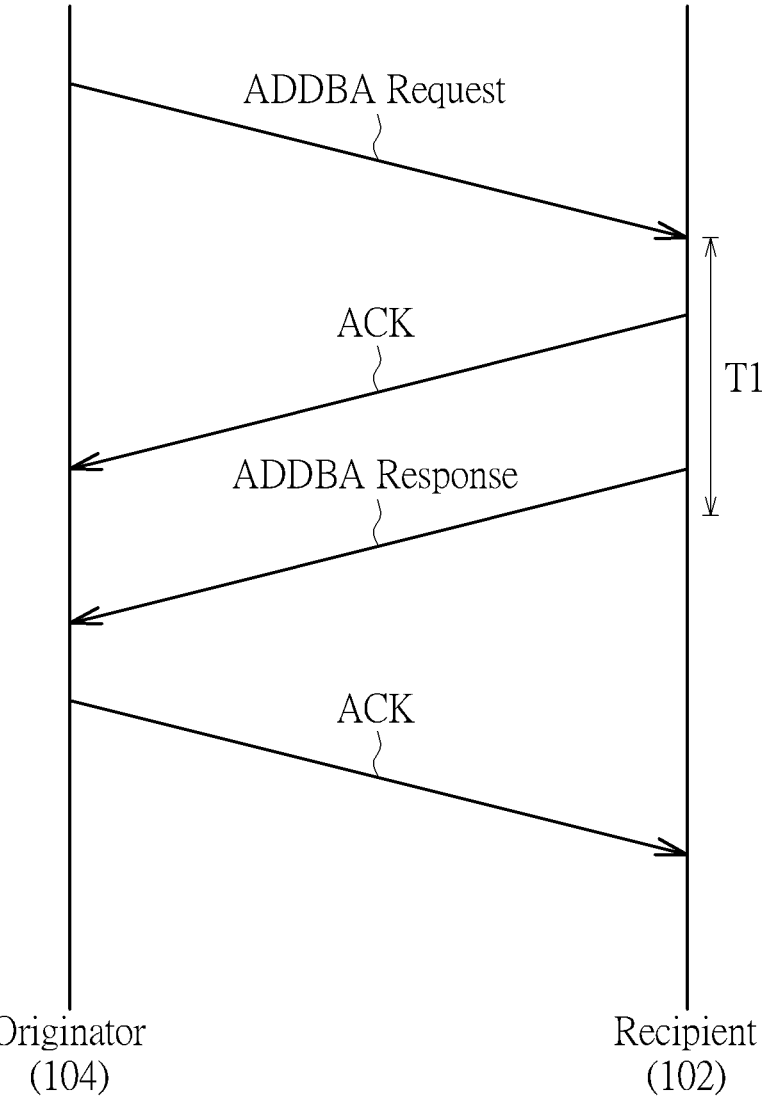
FIG. 5 is a sequence diagram illustrating a fourth negotiation procedure between an originator and a recipient according to an embodiment of the present invention.

Please refer to FIG. 5 in conjunction with FIG. 1. FIG. 5 is a sequence diagram illustrating a fourth negotiation procedure between an originator and a recipient according to an embodiment of the present invention. In this embodiment, the negotiation procedure is a secured procedure that can be used to replace the typical BAR/BA procedure for reordering buffer control. The wireless communication device 104 acts as an originator, and the wireless communication device 102 acts as a recipient. The proposed negotiation procedure shown in FIG. 5 is based on the typical ADDBA request/ response frame exchange. The major difference between the proposed negotiation procedure and the typical ADDBA request/response frame exchange is that time constraint is intentionally applied to the ADDBA response frame. In other words, the proposed negotiation procedure uses a time-constrained ADDBA response frame. For example, time constraint is applied to the ADDBA response frame by setting a timer for forcing the ADDBA response frame to be sent before a time-out duration expires.

As shown in FIG. 5, the wireless communication device 104 initiates the secured procedure for reordering buffer control by sending an ADDBA request frame to the wireless communication device 102, where the ADDBA request frame is a protected management frame configured to serve as a BAR frame (i.e., a substitute of a BAR frame) and carry reordering buffer control information (e.g., SSN and TID). In some embodiments, the ADDBA request frame is further configured to carry an indication, where the indication indicates that the ADDBA request frame serves as the BAR frame, thereby differentiating the usage of the ADDBA request frame.

In response to the ADDBA request frame received by the RX circuit 122 of the network interface circuit 118, the control circuit 116 starts a timer to count a time-out duration T1, generates an ACK frame (which is a control frame) corresponding to the ADDBA request frame and instructs the TX circuit 120 of the network interface circuit 118 to send the ACK frame immediately after SIFS of ending of the ADDBA request frame, and generates an ADDBA response frame (which is a protected management frame) following the ACK frame and instructs the TX circuit 120 of the network interface circuit 118 to send the ADDBA response frame before the time-out duration T1 expires. In one exemplary implementation, the time-out duration T1 can be negotiated during the association procedure between the wireless communication devices 102 and 104. For example, the time-out duration T1 may be requested by the wireless communication device 102 and accepted by the wireless communication device 104 during the association procedure, and can be used for controlling transmission of the ADDBA response frame after the wireless communication device 104 is associated with the wireless communication device 102. In another exemplary implementation, the time-out duration T1 can be announced by any of the wireless communication devices 102 and 104. For example, the time-out duration T1 may be announced through a beacon frame that is sent from any of the wireless communication devices 102 and 104.

In this embodiment, the ADDBA response frame is solicited by the ADDBA request frame, and is configured to serve as a BA frame (i.e., a substitute of a BA frame) and carry information (e.g., SSN) copied from recording buffer control information carried by the ADDBA request frame. The time-out duration T1 defines the maximum delay between the ADDBA request frame and the ADDBA response frame. Since the ADDBA response frame is a time-constrained response action frame that is forced to be sent before the time-out duration T1 expires, the delay between the ADDBA request frame and the ADDBA response frame is constrained, and the performance degradation issue suffered from using a typical secured procedure to replace a typical BAR/BA procedure can be resolved by using the proposed procedure shown in FIG. 5.

Figure 6:
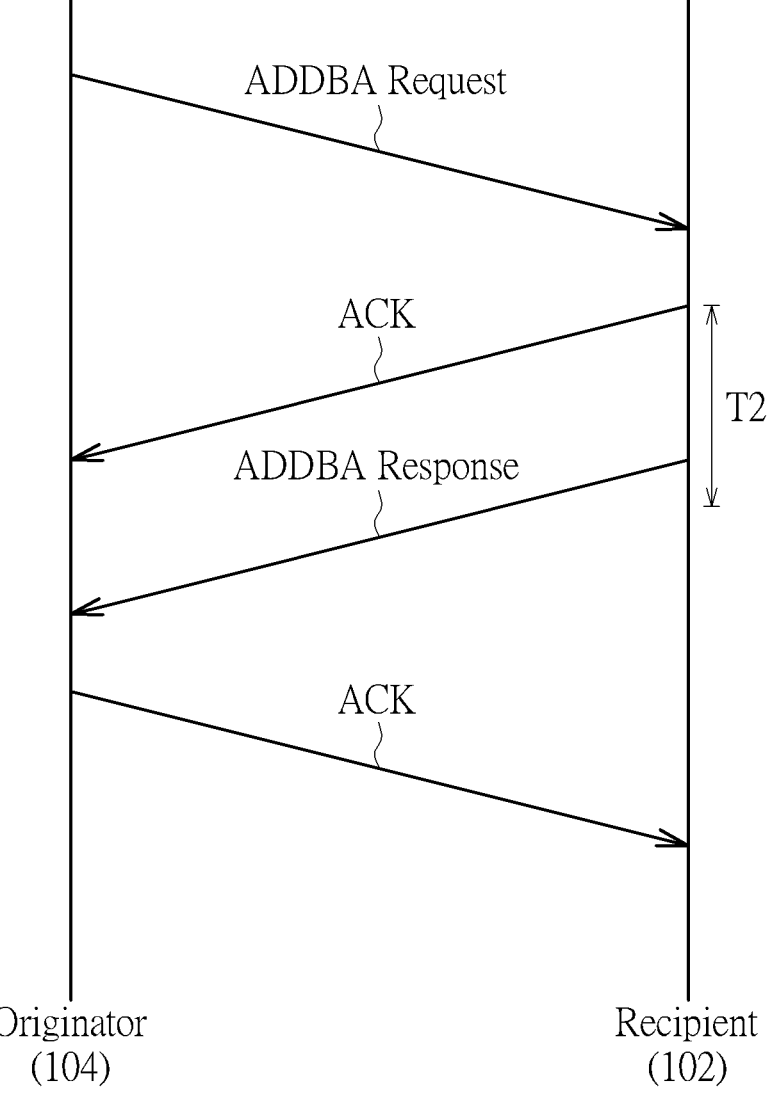
FIG. 6 is a sequence diagram illustrating a fifth negotiation procedure between an originator and a recipient according to an embodiment of the present invention.

Please refer to FIG. 6 in conjunction with FIG. 1. FIG. 6 is a sequence diagram illustrating a fifth negotiation procedure between an originator and a recipient according to an embodiment of the present invention. The major difference between the negotiation procedures shown in FIG. 5 and FIG. 6 is that the negotiation procedure shown in FIG. 5 starts a timer to count the time-out duration T1 from ending of the ADDBA request frame, and the negotiation procedure shown in FIG. 6 starts a timer to count a time-out duration T2 from ending of an ACK frame (which is a control frame) corresponding to the ADDBA request frame. In this embodiment, the control circuit 116 generates an ADDBA response frame (which is a protected management frame) following the ACK frame and instructs the TX circuit 120 of the network interface circuit 118 to send the ADDBA response frame before the time-out duration T2 expires. The time-out duration T2 can be negotiated during the association procedure between the wireless communication devices 102 and 104, or can be announced by any of the wireless communication devices 102 and 104.

In this embodiment, the ADDBA response frame is solicited by the ADDBA request frame, and is configured to serve as a BA frame (i.e., a substitute of a BA frame) and carry information (e.g., SSN) copied from recording buffer control information carried by the ADDBA request frame. The time-out duration T2 defines the maximum delay between the ACK frame (which responds to the ADDBA request frame) and the ADDBA response frame (which is paired with the ADDBA request frame). Since the ADDBA response frame is a time-constrained response action frame that is forced to be sent before the time-out duration T2 expires, the delay between the ACK frame and the ADDBA response frame is constrained, and the performance degradation issue suffered from using a typical secured procedure to replace a typical BAR/BA procedure can be resolved by using the proposed procedure shown in FIG. 6.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method comprising:
   receiving a protected management frame from a wireless communication device, wherein the protected management frame is configured to serve as a substitute of a request control frame; and
   in response to the protected management frame,
      generating an acknowledgement (ACK) control frame and sending the ACK control frame to the wireless communication device, wherein the ACK control frame is configured to pair with the protected management frame, and the wireless communication device views the ACK control frame as a valid confirmation of successful receive of the protected management frame; and
      skipping an operation of sending a response to the wireless communication device, wherein the response is not solicited by the protected management frame.

2. The wireless communication method of claim 1, wherein the protected management frame comprises a request action frame.

3. The wireless communication method of claim 1, wherein the protected management frame is configured to carry reordering buffer control information.

4. The wireless communication method of claim 1, wherein the protected management frame is configured to carry an indication indicating that the protected management frame is in replace of a BlockAckReq (BAR) frame.

5. The wireless communication method of claim 1, wherein a physical layer protocol data unit (PPDU) carrying the protected management frame comprises padding bits.

6. A wireless communication device comprising:
   a network interface circuit; and
   a control circuit, wherein in response to a protected management frame received from another wireless communication device by the network interface circuit, the control circuit is arranged to generate an acknowledgement (ACK) control frame that is configured to pair with the protected management frame, instruct the network interface circuit to send the ACK control frame to the another wireless communication device, and skip an operation of sending a response to the another wireless communication device, wherein the protected management frame is configured to serve as a substitute of a request control frame, the another wireless communication device views the ACK control frame as a valid confirmation of successful receive of the protected management frame, and the response is not solicited by the protected management frame.

7. The wireless communication method of claim 2, wherein the request action frame is an Add Block Ack (ADDBA) request frame.

8. The wireless communication device of claim 6, wherein the protected management frame comprises a request action frame.

* * * * *